Dec. 12, 1933.   J. W. ASPENLEITER   1,939,534
OPHTHALMIC MOUNTING
Filed Jan. 26, 1932
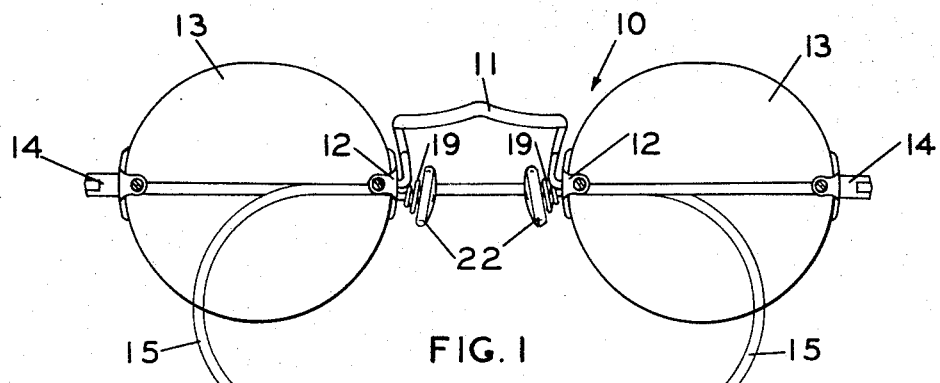
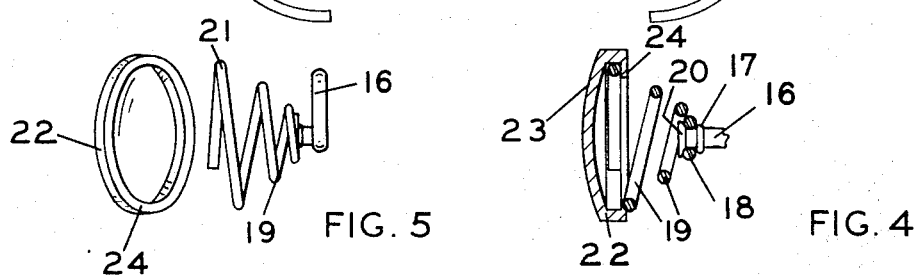
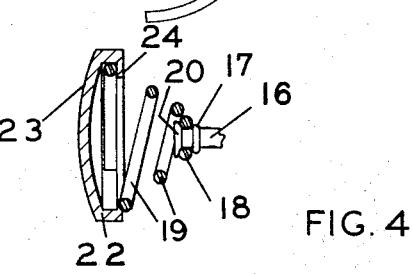
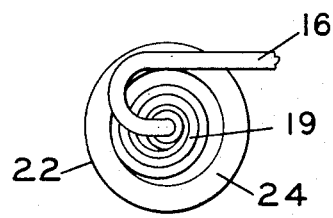
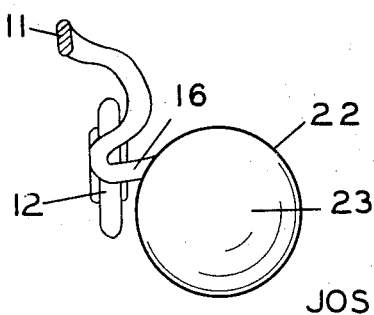
JOSEPH W. ASPENLEITER
INVENTOR
BY *G. A. Ellestad*
ATTORNEY Patented Dec. 12, 1933

1,939,534

UNITED STATES PATENT OFFICE 1,939,534

OPHTHALMIC MOUNTING

Joseph W. Aspenleiter, Rochester, N. Y., assignor to Bausch & Lomb Optical Company, Rochester, N. Y., a corporation of New York Application January 26, 1932. Serial No. 588,928

4 Claims. (Cl. 88—49)

This invention relates to ophthalmic mountings and more particularly it has reference to nose-engaging members which are known as nose guards or pads.

One of the objects of my invention is to provide an improved nose engaging member for an ophthalmic mounting. Another object is to provide an improved resilient mounting for a nose guard or pad. A further object is to provide a non-metallic nose-engaging member having an improved resilient mounting. These and other objects and advantages reside in certain novel features of construction, arrangement and combination of parts as will hereinafter be more fully disclosed and pointed out in the appended claims.

Referring to the drawing:

Fig. 1 is a front elevation of a pair of spectacles embodying my invention.

Fig. 2 is an enlarged face view of my improved nose guard.

Fig. 3 is a rear view of same.

Fig. 4 is a sectional view of same.

Fig. 5 is a view showing the nose-engaging member and its mounting in separated relation.

One embodiment of my invention is shown in the drawing wherein 10 indicates, generally, a pair of spectacles comprising the bridge 11 having the two devices or members 12 for holding lenses 13. The usual end pieces 14 and temples 15 are also provided. Secured to each lens holding member 12 is an arm 16 which extends rearwardly therefrom and thence downwardly and forwardly, as shown in Figs. 2 and 3.

On the end of arm 16 is a shoulder portion 17 against which the coil 18 of the spring 19 is securely held by means of a head 20 which is spun over on the end of arm 16. As shown on the drawing, the spring 19 is of a conical or helico-spiral form and comprises a series of coils which gradually increase in diameter from that of the smallest coil 18 to the largest coil 21. Secured to the larger end of spring 19 is the cup-shaped nose-engaging member 22 which is provided with a convex nose-engaging surface 23 and may be formed of any suitable material such as metal, celluloid, zyonite or the like. The member 22 has an inwardly turned flange 24 forming a recess into which the coil 21 of spring 19 may be forced and held by spring tension.

From the foregoing, it will be apparent that I am able to attain the objects of my invention and provide an improved resilient mounting for a nose-engaging member for an ophthalmic mounting. My improved mounting can, of course, be applied to spectacle frames having eye wires, as will be apparent to those skilled in the art. My mounting can also be applied to nose-engaging members or pads of various shapes and contours. Such a resilient mounting provides a comfortable nose-engaging member which can be readily fitted to the nose since the member is practically universally mounted so as to flex in different planes. No solder is used for mounting and attaching the spring and hence it retains its inherent resiliency. Heating of the spring incidental to a soldering operation would, of course, make it soft and non-resilient in parts, at least, so that it would not function in the desired manner. Various modifications can obviously be made without departing from the spirit of my invention.

I claim:

1. In an ophthalmic mounting, the combination of a lens holding device, an arm secured to said device, said arm having two enlarged portions, a coil spring having one end secured between said portions and a nose-engaging member mounted on the other end of said spring.

2. An ophthalmic mounting having in combination a lens holding device, a conical coil spring having its small end attached to said device, a nose-engaging member having a recess, the larger end of said spring being held within said recess by spring tension.

3. In an ophthalmic mounting, the combination of a lens holding device, an arm secured to said device, two enlarged portions on said arm, a coil spring having one end secured between said portions, a nose-engaging member having a recess, the other end of said spring being positioned in said recess.

4. In an ophthalmic mounting, the combination of a lens holding device, an arm secured to said device, a conical, coil spring having its small end secured to said arm, a non-metallic nose-engaging member having a flange forming a recess, the large end of said spring being mounted within said recess and retained therein by spring tension.

JOSEPH W. ASPENLEITER.